(12) United States Patent
Hiett et al.

(10) Patent No.: US 12,031,479 B2
(45) Date of Patent: Jul. 9, 2024

(54) HYBRID ELECTRIC PROPULSION SYSTEM LOAD SHARE

(71) Applicant: General Electric Company, Schenectady, NY (US)

(72) Inventors: David Alexander Hiett, Cincinnati, OH (US); Stefan Joseph Cafaro, Maineville, OH (US); Robert Jon McQuiston, Cincinnati, OH (US); David Marion Ostdiek, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 798 days.

(21) Appl. No.: 17/150,496

(22) Filed: Jan. 15, 2021

(65) Prior Publication Data
US 2022/0063824 A1 Mar. 3, 2022

Related U.S. Application Data

(60) Provisional application No. 63/072,573, filed on Aug. 31, 2020.

(51) Int. Cl.
*F02C 6/14* (2006.01)
*B64D 27/24* (2006.01)
(Continued)

(52) U.S. Cl.
CPC ............... *F02C 6/14* (2013.01); *B64D 27/24* (2013.01); *B64D 31/12* (2013.01); *F01D 15/10* (2013.01);
(Continued)

(58) Field of Classification Search
CPC ...... F02C 6/14; F02C 6/00; F02C 9/42; B64D 27/24; B64D 31/12; B64D 27/026;
(Continued)

(56) References Cited

U.S. PATENT DOCUMENTS

| 5,915,917 A | 6/1999 | Eveker et al. |
| 6,010,303 A | 1/2000 | Feulner |

(Continued)

FOREIGN PATENT DOCUMENTS

| CN | 103835881 B | 9/2016 |
| JP | 5923515 B2 | 5/2016 |

(Continued)

*Primary Examiner* — Medhat Badawi
(74) *Attorney, Agent, or Firm* — Dority & Manning, P.A.

(57) ABSTRACT

A method is provided for operating a hybrid-electric propulsion system having a first engine, a second engine, a first electric machine coupled to the first engine, and a second electric machine coupled to one of the first engine or the second engine. The method includes: receiving data indicative of a first engine operating parameter, a second engine operating parameter, or both; determining a first engine operating parameter margin, a second parameter operating margin, or both; determining a load share for the first engine, the second engine, or both, or between the first engine and the second engine based on the first engine operating parameter margin, the second engine operating parameter margin, or both; and transferring a first amount of power to or from the first electric machine and a second amount of power to or from the second electric machine in response to the determined load share.

18 Claims, 6 Drawing Sheets

(51) Int. Cl.
*B64D 31/12* (2006.01)
*F01D 15/10* (2006.01)
*F02C 6/00* (2006.01)
*B64D 27/02* (2006.01)

(52) U.S. Cl.
CPC .............. *F02C 6/00* (2013.01); *B64D 27/026* (2024.01); *F05D 2220/76* (2013.01)

(58) Field of Classification Search
CPC ......... B64D 27/02; B64D 31/00; F01D 15/10; F05D 2220/76; F05D 2260/42; F05D 2270/024; F05D 2270/051; F05D 2270/101; F05D 2270/112; Y02T 50/60
See application file for complete search history.

(56) References Cited

U.S. PATENT DOCUMENTS

| | | | |
|---|---|---|---|
| 6,059,522 A | 5/2000 | Gertz et al. | |
| 6,979,979 B2 | 12/2005 | Xu et al. | |
| 8,866,318 B2 | 10/2014 | Langford et al. | |
| 9,267,438 B2 | 2/2016 | Dooley et al. | |
| 9,428,267 B2 | 8/2016 | DeVita et al. | |
| 9,441,547 B2 | 9/2016 | Cai et al. | |
| 9,561,860 B2 | 2/2017 | Knapp et al. | |
| 9,630,510 B2 | 4/2017 | Sukumaran et al. | |
| 9,643,729 B2 | 5/2017 | Walter-Robinson | |
| 9,828,917 B2 | 11/2017 | Klonowski et al. | |
| 9,889,746 B2 | 2/2018 | Wolff et al. | |
| 10,023,319 B2 | 7/2018 | Teicholz et al. | |
| 10,260,471 B2 | 4/2019 | Huang | |
| 10,308,353 B2 | 6/2019 | Swann | |
| 10,392,119 B2 | 8/2019 | Niergarth et al. | |
| 10,435,165 B2 | 10/2019 | Swann et al. | |
| 10,436,059 B2 | 10/2019 | Liu et al. | |
| 10,442,547 B2 | 10/2019 | Miller et al. | |
| 10,450,886 B2 | 10/2019 | Sennoun | |
| 10,487,733 B2 | 11/2019 | Morgan | |
| 10,569,759 B2 | 2/2020 | Gansler et al. | |
| 10,644,630 B2 | 5/2020 | Smith et al. | |
| 10,676,199 B2 | 6/2020 | Hon et al. | |
| 10,696,416 B2 | 6/2020 | Gansler et al. | |
| 10,711,693 B2 | 7/2020 | Miller et al. | |
| 10,737,798 B2 | 8/2020 | Misfeldt | |
| 10,738,706 B2 | 8/2020 | Gansler et al. | |
| 10,953,995 B2 | 3/2021 | Gansler et al. | |
| 11,130,456 B2 | 9/2021 | Klemen et al. | |
| 2005/0225303 A1 | 10/2005 | Xu et al. | |
| 2010/0138089 A1 | 6/2010 | James | |
| 2013/0086919 A1 | 4/2013 | Dooley et al. | |
| 2013/0247579 A1 | 9/2013 | Morawski et al. | |
| 2015/0321752 A1 | 11/2015 | Trull et al. | |
| 2016/0325826 A1 | 11/2016 | Swann | |
| 2017/0044989 A1 | 2/2017 | Gemin et al. | |
| 2017/0057650 A1 | 3/2017 | Walter-Robinson | |
| 2017/0175565 A1 | 6/2017 | Sennoun | |
| 2017/0226933 A1 | 8/2017 | Klonowski et al. | |
| 2018/0065755 A1 | 3/2018 | Teicholz et al. | |
| 2018/0141674 A1 | 5/2018 | Bailey et al. | |
| 2018/0187604 A1 | 7/2018 | Poumarede et al. | |
| 2018/0194483 A1 | 7/2018 | Schwoller | |
| 2018/0319283 A1 | 11/2018 | Battin et al. | |
| 2018/0354631 A1 | 12/2018 | Adibhatla et al. | |
| 2018/0354632 A1 | 12/2018 | Hon et al. | |
| 2018/0370646 A1 | 12/2018 | Hon et al. | |
| 2019/0003398 A1 | 1/2019 | Gibson et al. | |
| 2019/0165708 A1 | 5/2019 | Smith et al. | |
| 2019/0186284 A1 | 6/2019 | Orkiszewski | |
| 2019/0345837 A1 | 11/2019 | Bacic | |
| 2020/0010205 A1 | 1/2020 | Swann et al. | |
| 2020/0056546 A1 | 2/2020 | Terwilliger et al. | |
| 2020/0056551 A1 | 2/2020 | Epstein | |
| 2020/0079513 A1 | 3/2020 | Pastouchenko et al. | |
| 2020/0095939 A1 | 3/2020 | Epstein | |
| 2020/0182158 A1 | 6/2020 | Kupratis | |
| 2020/0248619 A1 | 8/2020 | Romero et al. | |
| 2020/0284265 A1 | 9/2020 | Reepmeyer et al. | |

FOREIGN PATENT DOCUMENTS

| | | |
|---|---|---|
| WO | WO2008/049426 A1 | 5/2008 |
| WO | WO2008/085535 A2 | 7/2008 |
| WO | WO2014/085236 A1 | 6/2014 |

HYBRID ELECTRIC PROPULSION SYSTEM LOAD SHARE

CROSS-REFERENCE TO RELATED APPLICATION

This application is a non-provisional application claiming the benefit of priority under 35 U.S.C. § 119(e) to U.S. Provisional Application No. 63/072,573, filed Aug. 31, 2020, which is hereby incorporated by reference in its entirety.

FIELD

The present subject matter relates generally to a hybrid-electric aircraft propulsion system, hybrid-electric power systems for aircraft and aircraft engines, and methods for operating the same.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

Hybrid electric propulsion systems are being developed to improve an efficiency of the conventional commercial aircraft. Various hybrid electric propulsion systems include an electric machine driven by one of the aircraft engines. The inventors of the present disclosure have come up with various configurations and/or methods to improve the currently-known hybrid electric propulsion systems.

BRIEF DESCRIPTION

Aspects and advantages of the invention will be set forth in part in the following description, or may be obvious from the description, or may be learned through practice of the invention.

In one exemplary aspect of the present disclosure, a method is provided for operating a hybrid-electric propulsion system of an aircraft. The hybrid-electric propulsion system includes a first engine, a second engine, a first electric machine coupled to the first engine, and a second electric machine coupled to one of the first engine or the second engine. The method includes: receiving data indicative of a first engine operating parameter, a second engine operating parameter, or both; determining a first engine operating parameter margin, a second parameter operating margin, or both; determining a load share for the first engine, the second engine, or both, or between the first engine and the second engine based on the first engine operating parameter margin, the second engine operating parameter margin, or both; and transferring a first amount of power to or from the first electric machine and a second amount of power to or from the second electric machine in response to the determined load share.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
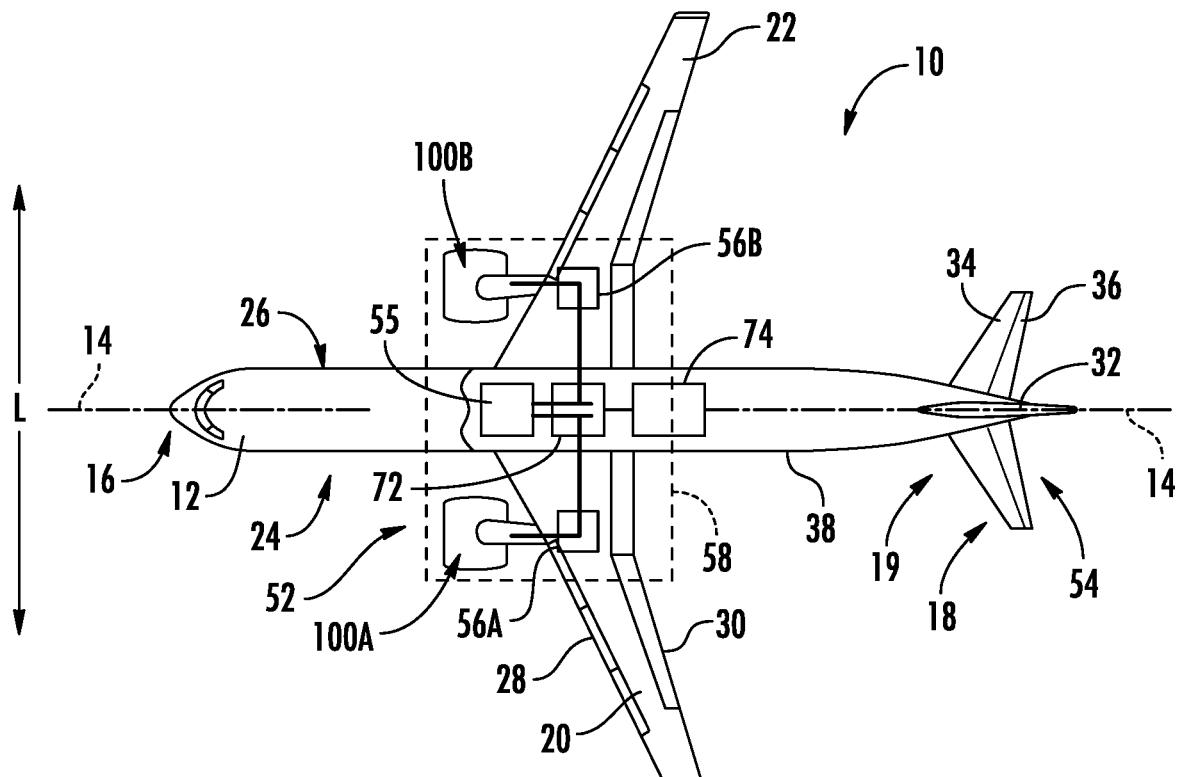
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary aspects of the present disclosure, systems and methods are provided for normalizing engine operating parameter margins between two or more engines of a hybrid-electric propulsion system for an aeronautical vehicle. For example, in one exemplary aspect of the present disclosure, the method may receive data indicative of a first engine operating parameter of a first engine and a second engine operating parameter of a second engine, and further may determine a first engine operating parameter margin for the first engine and a second engine operating parameter margin for the second engine. The engine operating parameters and engine operating parameter margins may be a fuel flow and a fuel flow margin, an exhaust gas temperature ("EGT") and an EGT margin, etc. The exemplary method may then determine a load share based on the first and second engine operating parameter margins and transfer a first amount of power to or from a first electric machine (coupled to the first engine) and a second amount of power to or from a second electric machine (coupled to one of the first engine or the second engine) in response to the determined load share and in accordance with the determined load share.

By way of example only, the second electric machine may be coupled to the second engine, and the method may determine that the first operating parameter margin is smaller than the second operating parameter margin. For example, if EGT is the first and second operating parameter, it may be determined that an EGT margin for the first engine (measured from the actual EGT of the first engine to an EGT limit for the first engine) is smaller than an EGT margin for the second engine (measure from the actual EGT of the second engine to an EGT limit for the second engine).

In response the method may determine a load share to normalize the EGT margins for the first and second engine. For example, the load share determined may dictate that the second engine should transfer some power to the first engine (via the first and second electric machines) such that the EGT margin for the first engine increases and the EGT margin for the second engine decreases, normalizing the two EGT margins.

Additionally or alternatively, the determined load share may dictate that a power source external to the first and second engines should transfer more power to the first engine (via the first electric machine) than to the second engine (via the second electric machine) such that the EGT margin for the first engine increases relative to the EGT margin for the second engine, normalizing the two margins.

Additionally or alternatively, the determined load share may dictate that the first engine (via the first electric machine) should transfer less power to a power sink (external to the first and second engines, such as an aircraft load) than the second engine (via the second electric machine) such that the EGT margin for the first engine increases relative to the EGT margin for the second engine, normalizing the two margins.

In other example aspects, however, the first electric machine may be coupled to a low pressure system of the first engine and the second electric machine may be coupled to a high pressure system of the first engine, and the method may determine that the first EGT margin is different than the second EGT margin. In response the determined load share may dictate that some power should be transferred between the high and low pressure systems to the first engine (via the first and second electric machines) such that the EGT margin for the first engine increases or decreases relative to the EGT margin for the second engine, normalizing the two margins.

In other examples, however, the first and second operating parameters and margins may be, e.g., based on fuel flow to the respective engine, or any other suitable parameter.

Figure 2:
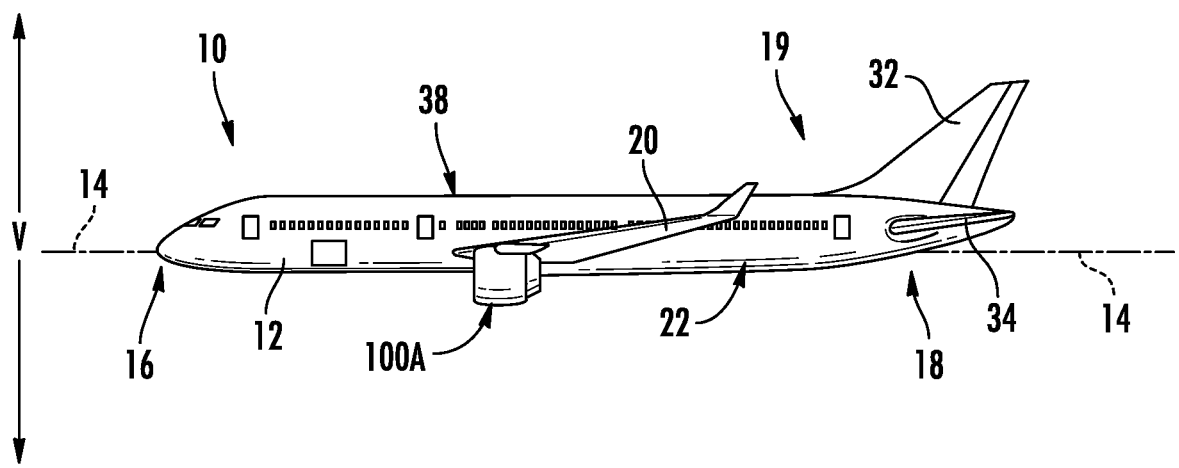
FIG. 2 is a side view of the exemplary aircraft of FIG. 1.

Referring now to the drawings, wherein identical numerals indicate the same elements throughout the figures, FIG. 1 provides a top, schematic view of an aircraft 10 having a hybrid-electric propulsion system 50 in accordance with still another exemplary embodiment of the present disclosure, and FIG. 2 provides a side, schematic view of the exemplary aircraft of FIG. 1. In particular, FIGS. 1 and 2 depict an aircraft 10, the aircraft 10 defining a longitudinal centerline 14 that extends therethrough, a lateral direction L, a forward end 16, and an aft end 18. The aircraft 10 includes a fuselage 12, an empennage 19, a first wing 20, and a second wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

The exemplary aircraft 10 of FIG. 1 additionally includes a hybrid-electric propulsion system 50 having a first gas turbine engine 100A, a second gas turbine engine 100B, and an electric energy storage unit 55. For the embodiment depicted, the first gas turbine engine 100A and second gas turbine engine 100B are each configured in an underwing-mounted configuration.

Figure 3:
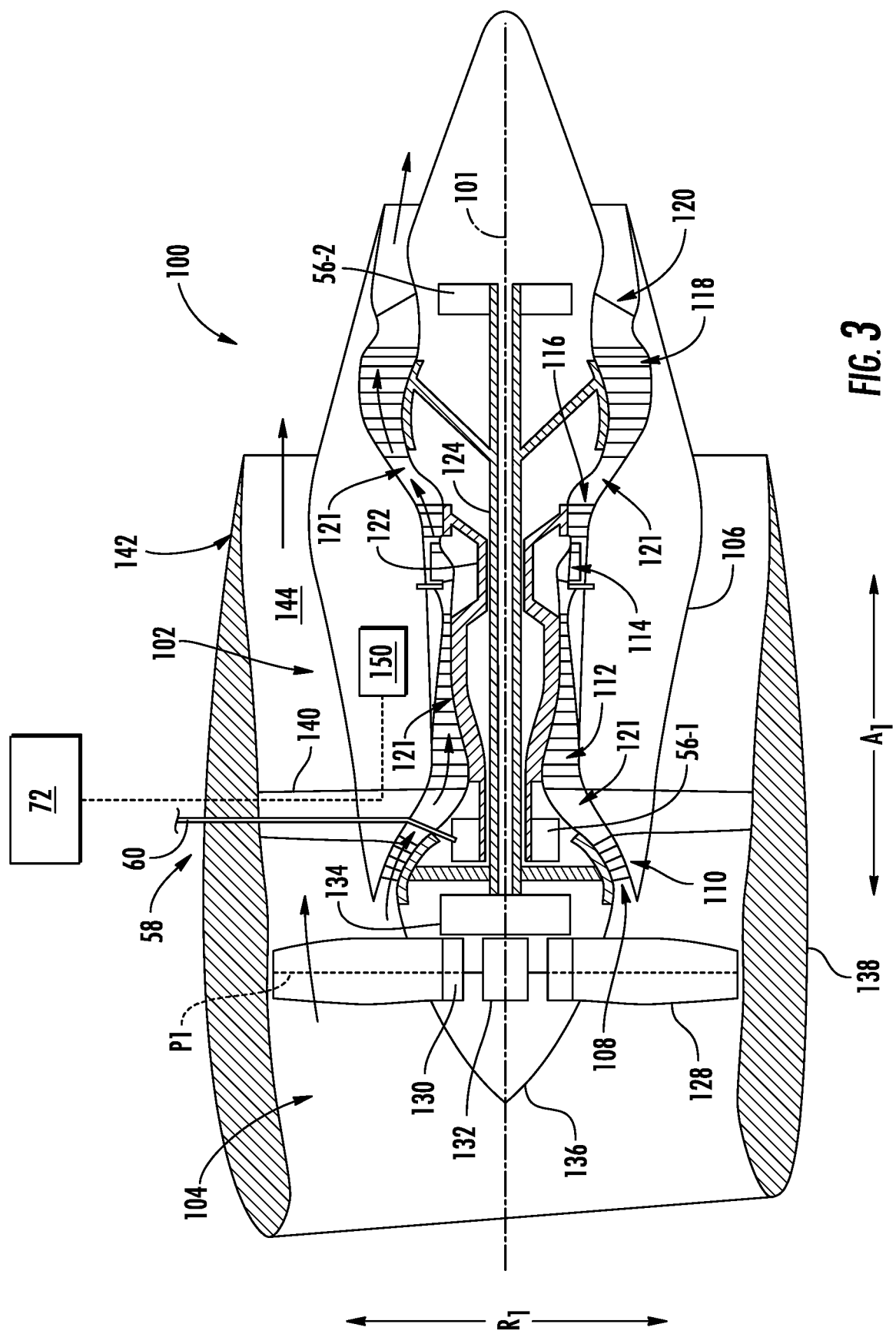
FIG. 3 is a schematic, cross-sectional view of a gas turbine engine in accordance with an exemplary embodiment of the present disclosure, as may be mounted to the exemplary aircraft of FIG. 1.

Referring now also to FIG. 3, a schematic, cross-sectional view is provided of a gas turbine engine 100. The first and second gas turbine engines 100A, 100B depicted in FIGS. 1 and 2 may be configured in a similar manner as the exemplary engine 100 of FIG. 3.

The gas turbine engine 100 of FIG. 3 is more particularly configured as a turbofan engine 100, including a turbomachine 102 and a fan 104. As shown in FIG. 3, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 3, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 3, the hybrid-electric propulsion system 50 additionally includes an electric machine, which for the embodiment depicted is configured as an electric motor/generator 56. The electric motor/generator 56 is, for the embodiment depicted, positioned within the turbomachine 102 of the turbofan engine 100 and is in mechanical communication with one of the shafts of the turbofan engine 100. More specifically, for the embodiment depicted, the electric motor/generator 56 is a first electric motor/generator 56-1, and is positioned inward of the core air flowpath 121, driven by the first, HP turbine 116 through the HP shaft 122. The first electric motor/generator 56-1 is configured to convert mechanical power of the HP shaft 122 to electric power during certain operations, and further is configured to convert electrical power to mechanical power in other operations. Accordingly, the first electric motor/generator 56-1 may be powered by the HP system (including the HP turbine 116) of the turbomachine 102 during certain operations and may power the HP system during other operations.

Further for the embodiment depicted, the hybrid-electric propulsion system 50 additionally includes a second electric motor/generator 56-2. The second electric motor/generator 56-2 is configured to convert mechanical power of the LP shaft 124 to electric power during certain operations, and further is configured to convert electrical power to mechanical power in other operations. Accordingly, the second electric motor/generator 56-2 may be powered by the LP system (including the LP turbine 118) of the turbomachine 102 during certain operations and may power the LP system during other operations.

Notably, the electric motor/generators 56-1, 56-2 may be relatively powerful motor/generators. For example, during certain operations, the motor/generators 56-1, 56-2 may be configured to generate at least about fifty kilowatts of electrical power or at least about sixty-five horsepower of mechanical power. In other embodiments, however, the electric motor/generators 56-1, 56-2 may generate other amounts of power.

It should be appreciated, however, that in other exemplary embodiments, the electric motor/generators 56-1, 56-2 may instead be positioned at any other suitable location within the turbomachine 102 or elsewhere, and may be, e.g., powered in any other suitable manner. For example, the first electric motor/generator 56-1 may be, in other embodiments, mounted coaxially with the HP shaft 122 within the turbine section, or alternatively may be offset from the HP shaft 122 and driven through a suitable gear train. Similarly, the second electric motor/generator 56-2 may be, in other embodiments, mounted coaxially with the LP shaft 124 within the compressor section, or alternatively may be offset from the LP shaft 124 and driven through a suitable gear train. Additionally, or alternatively, still, in other embodiments, the hybrid electric propulsion system 50 may not include both the first and second electric motor/generators 56-1, 56-2, and instead may only include one of such electric motor/generators 56-1, 56-2.

It should further be appreciated that the exemplary turbofan engine 100 depicted in FIG. 3 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor 52 may include any other suitable type of engine. For example, in other embodiments, the turbofan engine 100 may instead be configured as a turboprop engine or an unducted turbofan engine. Additionally, in still other embodiments, the turbofan engine 100 may instead be configured as any other suitable combustion engine for driving the electric motor/generators 56-1, 56-2. For example, in other embodiments, the turbofan engine may be configured as a turboshaft engine, or any other suitable combustion engine (such as an unducted, open rotor engine).

Referring still to FIGS. 1 and 2, the turbofan engine 100 further includes a controller 150, and although not depicted, one or more sensors. The controller 150 may be a full authority digital engine control system, also referred to as a FADEC. The controller 150 of the turbofan engine 100 may be configured to control operation of, e.g., the actuation member 132, a fuel delivery system to the combustion section 114 (not shown), etc. Additionally, the controller 150 may be operably connected to the one or more sensors to receive data from the sensors and determine various operational parameters of the turbofan engine 100. For example, the controller 150 may determine one or more of an exhaust gas temperature, a rotational speed of the core (i.e., a rotational speed of the HP system), a compressor discharge temperature, etc. Further, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first and second gas turbine engines 100A, 100B, the energy storage unit 55, etc. through a suitable wired or wireless communication system (depicted in phantom).

Referring back particularly to FIGS. 1 and 2, an electrical system of the hybrid-electric propulsion system 50 includes one or more electric machines (e.g., electric machine 56A, depicted schematically) mechanically coupled to the first gas turbine engine 100A and one or more electric machines (e.g., electric machine 56B, depicted schematically) mechanically coupled to the second gas turbine engine 100B. Although depicted schematically outside the respective gas turbine engines 100A, 100B, in certain embodiments, the electric motor/generators 56A, 56B may be positioned within a respective one of the gas turbine engines 100A, 100B (see, e.g., FIG. 3). Further, although a single electric motor/generator is depicted with each gas turbine engine 100A, 100B, in certain embodiments, a plurality of electric motor/generators 56A, 56B may be provided for each (e.g., electric motor/generators 56A-1, 56A-2 with gas turbine engine 100A, electric motor/generators 56B-1, 56B-2 with gas turbine engine 100B).

Moreover, as briefly mentioned above with reference to FIG. 3, for the embodiment of FIGS. 1 and 2 the hybrid electric propulsion assembly 50 further includes a controller 72. As will be appreciated, the energy storage unit 55 may be configured, in certain operating conditions, to receive electrical power from one or both of the first electric motor/generator 56A and the second electric motor/generator 56B, and may further be configured in certain operating conditions to provide stored electrical power to one or both of the first electric motor/generator 56A and the second electric motor/generator 56B. Moreover, the controller 72 is operably connected to turbofan engines 100A, 100B, electric motor/generators 56A, 56B, and energy storage unit 55 to, e.g., control operations of the hybrid electric propulsion system 50 and selectively electrically connect components of the hybrid electric propulsion system 50 during the various operating conditions.

Further, the controller 72 may be in communication with one or more aircraft controllers for receiving data indicative of an aircraft need for electrical power, and may in response provide electrical power from one or more of the electric motor/generators 56A, 56B and the energy storage unit 55 to an aircraft load 74.

It should be appreciated, however, that in still other exemplary embodiments of the present disclosure, any other suitable aircraft 10 may be provided having a hybrid-electric propulsion system 50 configured in any other suitable manner. For example, in other embodiments, the turbofan engines 100A, 100B may each be configured as any other suitable combustion engine (e.g., turboprop engine, unducted turbofan engine, turboshaft engine, turbojet engine, etc.), and may be mounted at any other suitable location.

Moreover, in still other exemplary embodiments, the exemplary hybrid electric propulsion system 50 may have still other configurations. For example, referring now briefly to FIG. 4, a schematic diagram of a hybrid-electric propulsion system 50 in accordance with yet another exemplary embodiment of the present disclosure is provided. The exemplary hybrid electric propulsion system 50 depicted in FIG. 4 may be similar to one or more the exemplary hybrid electric propulsion systems 50 described above with reference to FIGS. 1 through 3.

Figure 4:
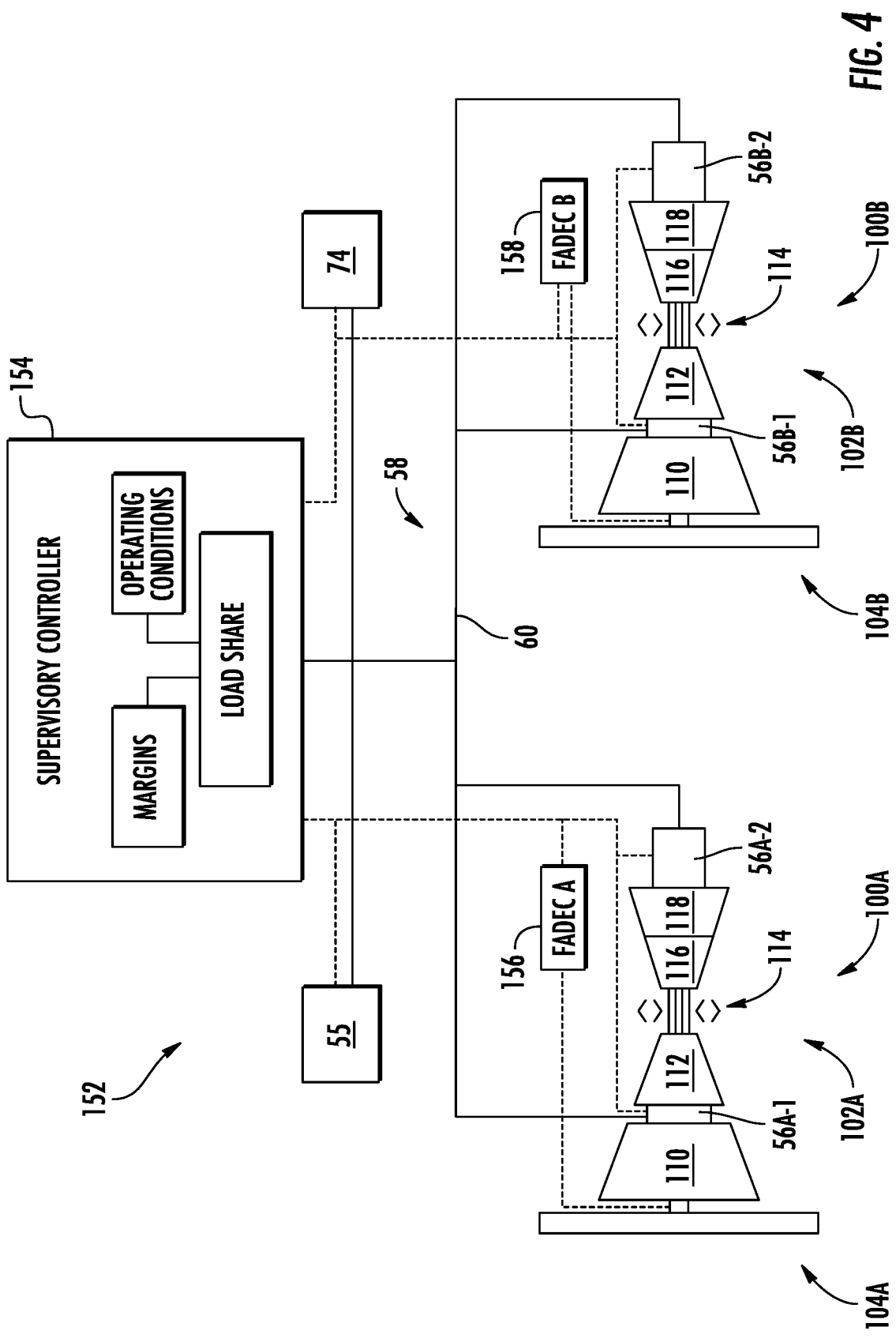
FIG. 4 is a schematic view of a propulsion system in accordance with an exemplary embodiment of the present disclosure.

For example, the exemplary hybrid-electric propulsion system 50 of FIG. 4 generally includes a first propulsor 52 and a second propulsor 54. The first propulsor 52 generally includes a first engine 100A having first turbomachine 102A and a first propulsor 104A, and a second engine 100B having a second turbomachine 102B and a second propulsor 104B. Each of the first and second turbomachines 102A, 102B generally includes a low pressure system having a low pressure compressor 110 drivingly coupled to a low pressure turbine 118 through a low pressure shaft (not labeled), as well as a high pressure system having a high pressure compressor 112 drivingly coupled to a high pressure turbine 116 through a high pressure shaft (not labeled).

Additionally, the first propulsor 104A is drivingly coupled to the low pressure system of the first turbomachine 102A and the second propulsor 104B is drivingly coupled to the low pressure system of the second turbomachine 102B. In certain exemplary embodiments, the first propulsor 104A and first turbomachine 102A may be configured as a first turbofan engine and similarly, the second propulsor 104B and second turbomachine 102B may be configured as a second turbofan engine (see, e.g., FIG. 3). Alternatively, however, these components may instead be configured as parts of a turboprop engine or any other suitable turbomachine-driven propulsion device.

Moreover, the hybrid electric propulsion system 50 of FIG. 4 additionally includes an electrical system. More specifically, the hybrid electric propulsion system 50 includes one or more electric machines operable with the first engine 100A, the second engine 100B, or both, and an electric energy storage unit 55 electrically connectable to one or more of these electric machines.

In particular, for the embodiment depicted, the hybrid electric propulsion system 50 includes a first electric machine 56A-1 and a second electric machine 56A-2 operable with the first engine 100A and a first electric machine 56B-1 and a second electric machine 56B-2 operable with the second engine 100B.

More specifically, for the embodiment depicted, the first electric machines 56A-1, 56B-1 are each coupled to the high pressure systems of the respective turbomachines 102A, 102B (see electric machine 56-1 in FIG. 2) and the second electric machines 56A-2, 56B-2 are each coupled to the low pressure systems of the respective turbomachines 102A, 102B (see electric machine 56-2 in FIG. 2).

As is also depicted in FIG. 4, the exemplary hybrid electric propulsion system 50 further includes a power bus 58. The first electric machines 56A-1, 56A-2, the second electric machines 56B-1, 56B-2, and the electric energy storage unit 55 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough. The various switches and other power electronics may be operably coupled to the controller, such that the controller may control the power flow to and/or from the first electric machines 56A-1, 56A-2, the second electric machines 56B-1, 56B-2, and the electric energy storage unit 55.

Moreover, as is also depicted, the power bus 58 is electrically connected to one or more aircraft systems 74 for providing electrical power from one or more of the first electric machines 56A-1, 56A-2, the second electric machines 56B-1, 56B-2, and the electric energy storage unit 55 to the one or more aircraft systems 74. The one or more aircraft systems 74 may include, e.g., environmental controls, aircraft controls, hydraulic systems, pumps, de-icing systems, navigation, illumination, heating, etc.

In addition, the system depicted in FIG. 4 includes a control system 152 having a supervisory controller 154, which may be similar to controller 72 described above, a first gas turbine engine controller 156 (which may be, e.g., a FADEC controller) and a second gas turbine engine controller 158 (which may also be, e.g., a FADEC controller). The exemplary control system 152 may receive data indicative of one or more operability parameters of the first gas turbine engine 100A, the second gas turbine engine 100B, or both. For example, the exemplary control system 152 may receive data indicative of: one or more fuel flows, one or more operating temperatures (e.g., an exhaust gas temperature, compressor exit temperature, turbine inlet temperature, etc.), one or more speeds of the gas turbine engines (e.g., a rotational speed of the low pressure system, a rotational speed of the high pressure system, a rotational speed of the fan/propeller, etc.), one or more shaft torques, one or more pressure measurements, one or more thrust outputs (which may be, e.g., a calculation from a combination of a fan/propeller speed and a fan/propeller pitch angle), identifying serial numbers of component or other unique component identifiers (such as of the one or more engines), estimates or measurements of component consumed or residual life or performance, any combination of these or calculation derived from these, etc.

As will be appreciated, within a particular propulsion system of an aircraft, each of the gas turbine engines may define a different performance level due to, e.g., age of the engine, date of last maintenance, production variation, as well as a slew of other factors. Due to the variation in hardware quality and performance characteristics, each gas turbine engine may require a different amount of fuel or electrical power to run at a set speed or power setting, such as at an idle speed or take-off power. The amount of energy in the form of fuel or electrical power required provided to run at this set speed may influence the operating speeds, temperatures and pressures, affect the rate of hardware deterioration from the combination of those characteristics, and set a margin available for the particular engine to accelerate from that speed to a higher speed. For example, the amount of fuel required for the particular engine to run at an idle speed may set the margin for the particular engine to accelerate from idle to take off. In addition, the level of deterioration of the engine may also affect the stall margin, exhaust gas temperature margin, etc.

When one engine of a particular propulsion system has a change in component quality or expected performance, due to deterioration, damage from foreign object debris (FOD) passing through the core inlet in-flight, or other factors, and of a different amount relative to another engine of the propulsion system (e.g., different overall deteriorations), such a difference creates different acceleration margins within the plurality of engines 100A, 100B, along with stall margins, exhaust gas temperature margins, hardware deterioration rates, maximum sustainable power, etc.

Accordingly, referring still to FIG. 4, it will be appreciated that exemplary hybrid electric propulsion system 100 may accommodate these differing hardware characteristics/deteriorations between engines 100A, 100B to facilitate consistent margins for said engines 100A, 100B. More specifically, as noted, FIG. 4 depicts a schematic diagram of a hybrid-electric propulsion system 50 that may accommodate different deteriorations between engines of a propulsion system 100 to facilitate constant margins for said engines 100A, 100B.

Figure 7:
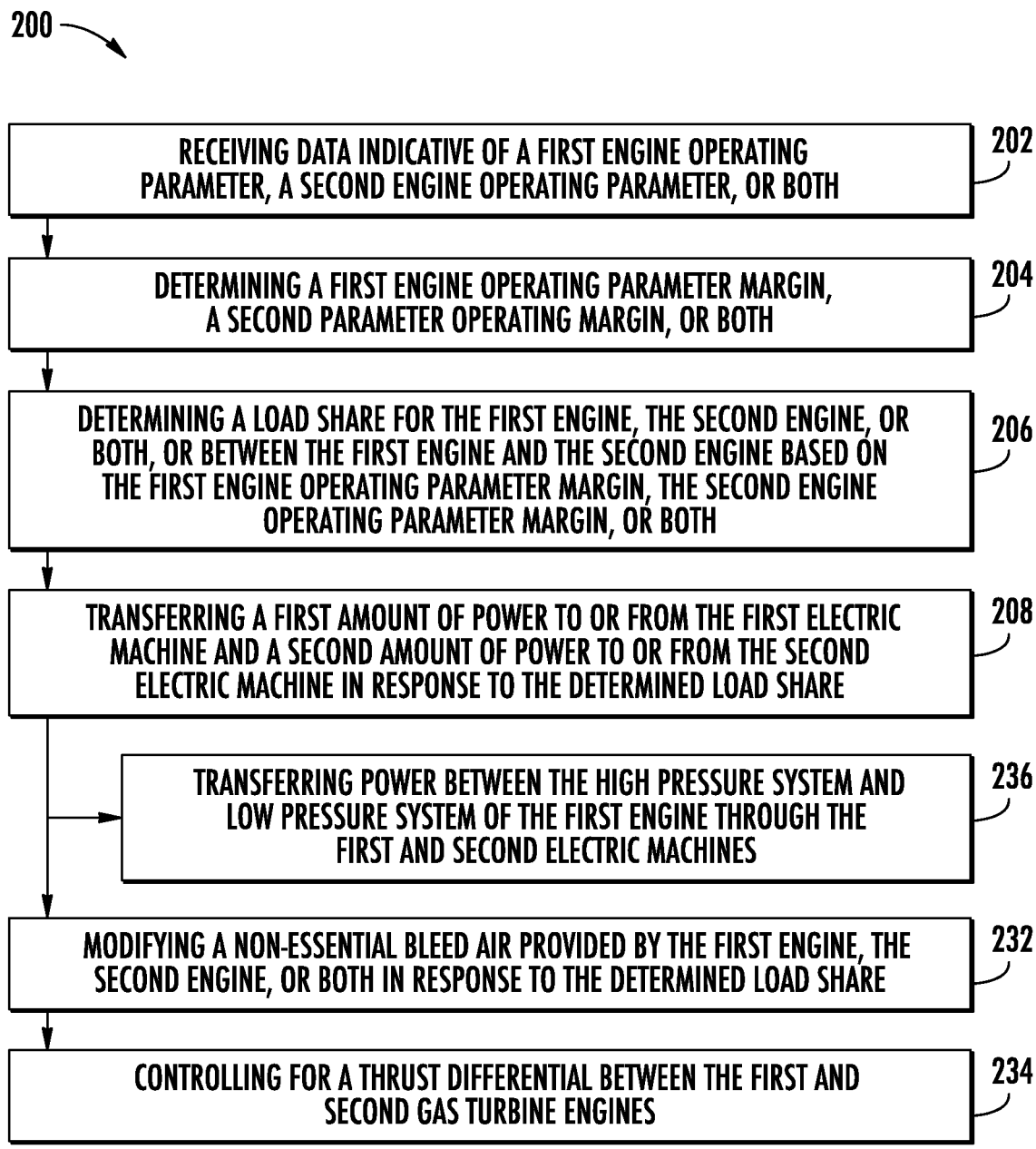
FIG. 7 is a flow diagram of a method for operating a hybrid electric propulsion system in accordance with another exemplary aspect of the present disclosure.

The exemplary control scheme depicted schematically in FIG. 7 generally receives data indicative of one or more parameters of the first gas turbine engine 100A and the second gas turbine engine 100B, such as one or more parameters indicative of an operating condition of the engine and/or a health of the engine. In particular, for the embodiment depicted, the engine controllers 156, 158 may receive this data indicative of the one or more parameters and provide such data to the supervisory controller 154. The supervisory controller 154 includes a margin calculation module For example, in the exemplary control scheme the engine controllers 156, 158 may receive data indicative of a fuel flow to the first gas turbine engine 100A and a fuel flow to the second gas turbine engine 100B. The first and second engine controllers 156, 158 may provide such data to the supervisory controller 154. The supervisory controller 154 may use such data to calculate or otherwise determine a margin for each engine 100A, 100B. More specifically, for the exemplary aspect depicted, the supervisory controller 154 includes a margin calculation module 160 to calculate or otherwise determine a margin for each engine 100A, 100B. The margin may be any margin parameter indicative of an available amount of increased operating condition for the engine 100A, 100B (e.g., fuel flow margin, temperature margin, etc.).

It will be appreciated, however, that in other exemplary aspects, the margin may instead be calculated or otherwise determined by the engine controllers 156, 158 and provided to the supervisory controller 154.

The supervisory controller 154 may also receive operating condition parameters with an operating condition module 162 indicative of a desired operating condition for the engines 100A, 100B, such as a desired power output for the engine.

Referring still to FIG. 4, the supervisory controller 154 may additionally be configured to determine a load share between the first and second engines 100A, 100B based on the calculated or otherwise determined margin information for each engine 100A, 100B from the margin module 160 and the desire operating condition data from the operating condition module 162. More specifically, the supervisory controller 154 includes a load share module 164 for receiving data from the margin module 160 and operating condition module 162 and determining a load share for the first engine 100A, the second engine 100B, or both. The load share determined by the load share module 164 may include on or more of the following: (1) transferring power from the first engine 100A to the second engine 100B, or vice versa; (2) transferring power from the electric energy storage unit 55, the first engine 100A, or both to the second engine 100B, or from the electric energy storage unit 55, the second engine 100B, or both to the first engine 100A; (3) transferring power from a low pressure system of one of the first or second engines 100A, 100B to a high pressure system of the same engine, or vice versa; and/or (4) extracting a different amount of power from the first and second engines 100A, 100B. In such a manner, the system may normalize the margins of the two engines 100A, 100B.

For example, referring still to FIG. 4, the margin used by the system may be a fuel flow margin. The engine controllers 156, 158 may receive data indicative of the fuel flow margins for each engine 100A, 100B (e.g., a fuel flow to the respective engine) and provide such information to the supervisory controller 154. The supervisory controller 154 may then calculate a first fuel flow margin for the first gas turbine engine 100A and a second fuel flow margin for the second gas turbine engine 100B.

Alternatively, the engine controllers 156, 158 may receive the data indicative of the fuel flow to the first and second gas turbine engines 100A, 100B, and calculate the first and second fuel flow margins.

The supervisory controller 154, using the first and second fuel flow margins and received operating condition data for the engines 100A, 100B, may then calculate a load sharing to normalize a fuel flow margin of the first gas turbine engine 100A with a fuel flow margin of the second gas turbine engine 100B. The load sharing may be communicated to the first engine controller 156, the second engine controller 158, and/or the electric bus 106 to implement the load sharing, or alternatively may be communicated directly to the electric machines 56A-1, 56A-2, 56B-1, 56B-2 and/or various power switches and power electronics of the power bus 58 to implement the load sharing.

In certain embodiments, the load sharing may define an amount of power to be extracted from the first gas turbine engine 100A through the electric machine 56A-1 and the electric machine 56A-2, and from the second gas turbine engine 100B through the second electric machine 56B-1 and the second electric machine 56B-2, such that more power is extracted from the engine defining a lower or smaller fuel flow margin (indicative of it being the more deteriorated engine) than the engine defining a higher or larger fuel flow margin. For example, the supervisory controller 154 may determine the first fuel flow margin is less than the second flow margin, and in response may calculate a load sharing that extracts more power from the second gas turbine engine 100B than from the first gas turbine engine 100A.

Additionally, or alternatively, the control scheme may be configured such that no power is extracted from the more deteriorated engine, and/or such that power is provided to the more deteriorated engine. For example, the supervisory controller 154 may determine the first fuel flow margin is less than the second flow margin, and in response may calculate a load sharing that extracts power from the second gas turbine engine 100B and provides power to the first gas turbine engine 100A. The power provided to the more deteriorated engine may come from the less deteriorated engine. Further, the power provided to the more deteriorated engine may be supplemented in minor or major part by external sources (such as an energy storage unit, an Auxiliary Power Unit, etc.). For example, between 5% and 95% of the power provided to the more deteriorated engine may be provided from external sources, such as a the APU, the energy storage unit (located, e.g., in the aircraft wing or fuselage, or pylon).

Additionally, or alternatively, the calculated load share may transfer electrical power between the low pressure system and the high-pressure system of a given gas turbine engine 100A, 100B. For example, the calculated load share may transfer power from the low-pressure system and provide such extracted power to the high-pressure system utilizing the electric machines 56A-1, 56A-2, 56B-1, 56B-2 of the given gas turbine engine 100A, 100B (or vice versa). This may allow for lower idle speeds that improve part life, reduce fuel burn, and reduce idle thrust.

In certain exemplary embodiments, the load share may further dictate an amount of engine bleed pulled from one engine relative to the other engine. Such may have a similar effect as varying a ratio of electric power extracted from the two engines. With respect to bleed air extracted from engines, bleed air non-essential to engine performance (bleed air essential to engine performance typically includes such things as air used for turbine blade or oil cooling, maintaining an operating-stall line buffer, etc.) may be extracted less from the more deteriorated engine (bleed air non-essential to engine performance may include air used to service an aircraft environmental control system (ECS), de-ice and/or anti-ice system, etc.) and more from the less-deteriorated engine.

These control decisions may be based at least in part on the magnitude of the delta (i.e., difference) between any parameter or combination of parameters measured or calculated, such as in one embodiment fuel flow. These control decisions may be influenced by both real time data, in addition to, or in the alternative long term tracking of this data as a function of power settings, ambient conditions, estimates from tracking these data of hardware quality, etc.

For example, in certain exemplary embodiments, the parameters used herein may be based at least in part on one or more of the following: one or more fuel flows, one or more operating temperatures (e.g., an exhaust gas temperature, compressor exit temperature, turbine inlet temperature, etc.), one or more speeds of the gas turbine engines (e.g., a rotational speed of the low pressure system, a rotational speed of the high pressure system, a rotational speed of the fan/propeller, etc.), one or more shaft torques, one or more pressure measurements, one or more thrust outputs (which may be, e.g., a calculation from a combination of a fan/propeller speed and a fan/propeller pitch angle), identifying serial numbers of component or other unique component identifiers (such as of the one or more engines), estimates or measurements of component consumed or residual life or performance, any combination of these or calculation derived from these, or the like.

Additionally, or alternatively, still, the control scheme may utilize temperature data, such as exhaust gas temperature data for the first and second gas turbine engines 100A, 100B to determine the load sharing. For example, in addition to, or in the alternative, the control scheme may receive exhaust gas temperature data from the first gas turbine engine 100A through the first engine controller 156, exhaust gas temperature data from the second gas turbine engine 100B through the second engine controller 158, and utilizing this data may calculate a first exhaust gas temperature margin and a second exhaust gas temperature margin.

Figure 5:
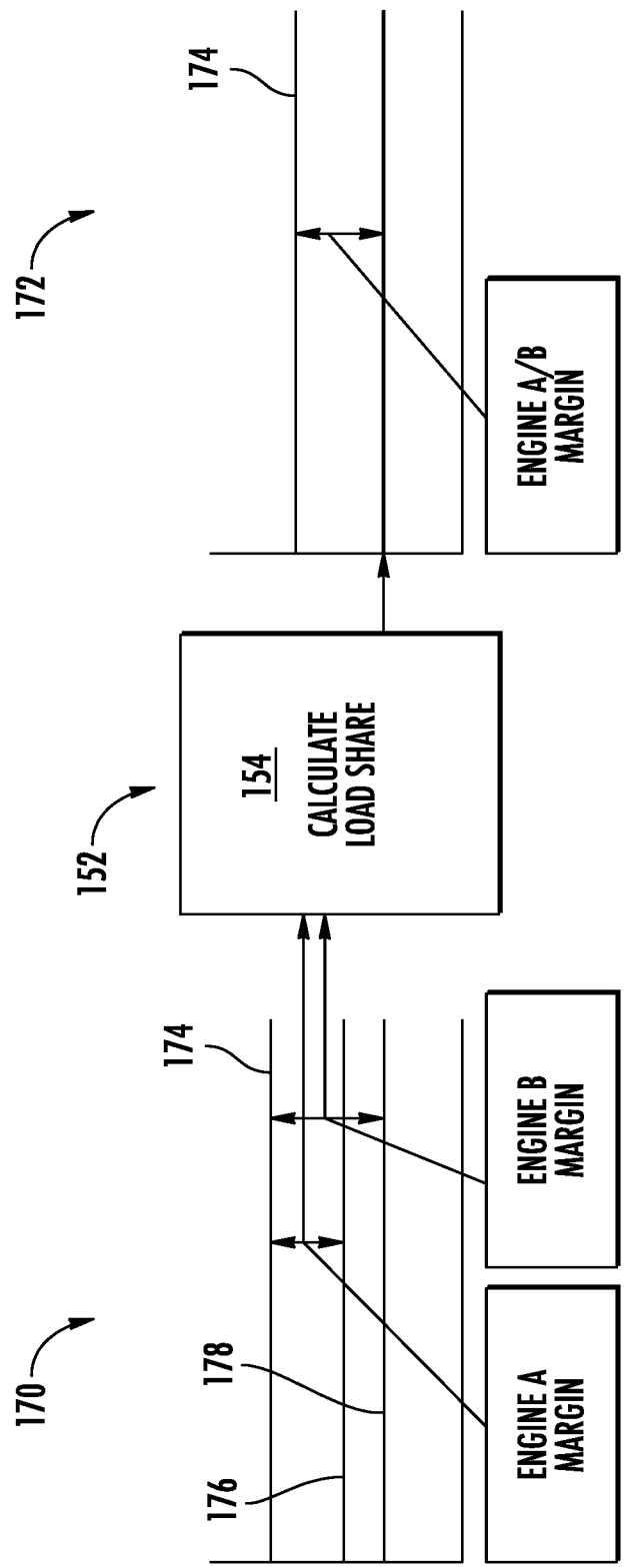
FIG. 5 is a graphical representation of a load share in accordance with an exemplary aspect of the present disclosure.

For example, referring now to FIG. 5, an embodiment of the load share concept is depicted graphically. Specifically, the first graph 170 on the left and the second graph 172 on the right each depict the relevant limit at 174, such as a fuel flow limit or a temperature limit (e.g., exhaust gas temperature limit), in red. The first graph 170 further the depicts a level of the parameter of the first gas turbine engine 100A at line 176 and a level of the same parameter of the second gas turbine engine 100B at 178. The first graph 170 depicts these levels before any load sharing modification, e.g., without any load sharing between the first and second gas turbine engines 100A, 100B, or power supplements from any external sources, or load sharing between the low pressure and high pressure systems of one or both of the engines 100A, 100B, or modification of power extraction from one or both of the engines 100A, 100B. As will be appreciated, the first gas turbine engine 100A ("Engine A") appears to be more deteriorated than the second gas turbine engine 100B ("Engine B"), as a margin for Engine A between the level of the parameter and the parameter limit for the first gas turbine engine 100A is less than a margin for Engine B between the level of the parameter of the parameter limit for the second gas turbine engine 100B.

Based on this information, the control system 152 and supervisory controller 154 for the propulsion system 100 may calculate a load sharing to normalize the margins for the first and second engines 100A, 100B. For example, based on this information, the control system 152 and supervisory controller 154 for the propulsion system 100 may calculate a load sharing whereby a first amount of power from the first gas turbine engine 100A is extracted through one or both of the first LP electric machine 56A-1 and/or the first HP electric machine 56A-2 and a second amount of power from the second gas turbine engine 100B is extracted through one or both of the second LP electric machine 56B-1 and the second HP electric machine 56B-2, and, whereby the first amount of power is less than the second amount of power (and may be zero or a negative amount, i.e., power may instead be supplied from the first gas turbine engine 100A to the second gas turbine engine 100B, or vice versa).

As depicted in the second graph 154 on the right in FIG. 5, after the load sharing is applied, the margin between the parameter and the parameter limit for both engines 100A, 100B is substantially the same. This may result in a more similar acceleration capacity, stall margin capacity, exhaust gas temperature margin capacity, etc. between the two engines.

Notably, referring back specifically to FIG. 4, the control system 152 may further control for a thrust output of the first and second gas turbine engines 100A, 100B in conjunction with the load sharing. For example, the first engine controller 156 may control a pitch and/or speed of a propeller of the first gas turbine engine 100A and similarly, the second engine controller 158 may control a pitch and/or speed of a propeller of the second gas turbine engine 100B to ensure a thrust output of the first gas turbine engine 100A is substantially equal to a thrust output of the second gas turbine engine 100B despite the load sharing that is applied between the two engines 100A, 100B. Such a configuration may help reduce thrust asymmetric loads for the aircraft and help synchronize speeds between the two engines.

In addition, the control system 152 may in other exemplary embodiments control for thrust output of the first and second gas turbine engines 100A, 100B in any other suitable manner. For example, in other exemplary embodiments the first and/or second gas turbine engines 100A, 100B may be configured as unducted turbofan engines, having variable pitch outlet guide vanes. For example, the engines 100A, 100B may be configured similarly to the engine 100 depicted in FIG. 3, but may not include the nacelle 138, and the outlet guide vanes 140 may be operable with a pitch change mechanism for changing a pitch of the outlet guide vanes 140. In such a manner, the variable outlet guide vanes 140 may affect a thrust output of the engine 100 without changing a rotational speed of the fan. With such a configuration, the outlet guide vanes 140 may have any suitable length, spacing, number, etc. In such a configuration, the first engine controller 156 may control a pitch of the variable outlet guide vanes of the first engine 100A in addition to, or in the alternative to, a pitch and/or speed of a propeller of the first gas turbine engine 100A. Similarly, the second engine controller 158 may control a pitch of the variable outlet guide vanes of the second engine 100B in addition to, or in the alternative to, a pitch and/or speed of a propeller of the second gas turbine engine 100B. Such may further ensure a thrust output of the first gas turbine engine 100A is substantially equal to a thrust output of the second gas turbine engine 100B despite the load sharing that is applied between the two engines 100A, 100B, and without significantly impacting synchrophasing and/or acoustics of the engines 100A, 100B.

It will be appreciated that the exemplary embodiments and control schemes described herein with reference to FIGS. 4 and 5 are provided by way of example only. For example, in other embodiments, the first and second gas turbine engines 100A, 100B may not each include both LP and HP electric machines; the control system 152 may not include a separate aircraft controller and the control decisions discussed herein may be accomplished through the engine controllers; the control system 152 may not utilize separate engine controllers, etc.

Further, it will be appreciated that for the embodiment shown the control scheme determines both a first engine operating parameter margin and a second engine operating parameter margin, and subsequently determines a load share between the first engine and the second engine to reduce a difference between the first engine operating parameter margin and the second parameter operating margin. For example, in certain exemplary aspects, the control scheme may calculate the first and/or second engine operating parameter margin(s) using one or more onboard embedded engine models within the supervisory controller 154, or by using a parameter calculated from offline trends read in by a configuration or data entry plug.

However, in still other exemplary aspects, the control scheme may instead only determine one of the first or second engine operating parameter margins, and may determine the load share based on the one engine calculated operating parameter margin. In such a case, the load share may take into account the calculated margin being above or below a predetermined threshold. Further, in other exemplary aspects, the control scheme may calculate the load share based on the engine operating parameter values without necessarily calculating the engine operating parameter margins of the two engines. Further, in still other exemplary aspects, the control scheme may calculate the engine operating parameter margins without receiving data indicative of the engine operating parameters and instead based on engine identification information, which may indicate, e.g., an age of the engine(s), time since maintenance activities, a virtual engine model, lookup tables, etc.

Figure 6:
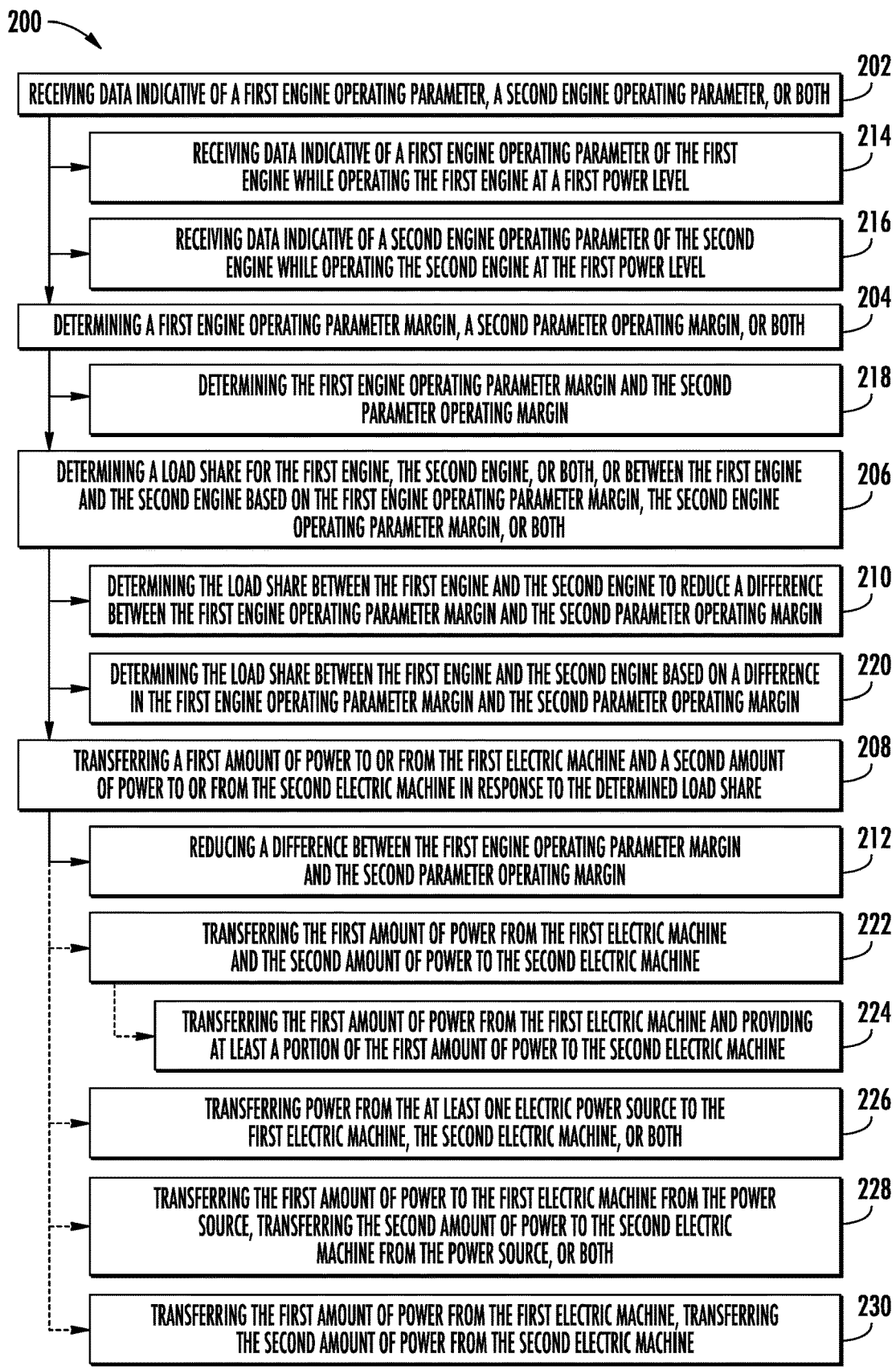
FIG. 6 is a flow diagram of a method for operating a hybrid electric propulsion system in accordance with an exemplary aspect of the present disclosure.

Referring now to FIG. 6, a flow diagram of a method 200 for operating a hybrid-electric propulsion system of an aircraft in accordance with an exemplary aspect of the present disclosure is provided. The method 200 may be utilized with one or more of the exemplary embodiments herein.

For example, in certain exemplary aspects of the method 200, the hybrid-electric propulsion system may include a first engine, a second engine, a first electric machine coupled to the first engine, and a second electric machine coupled to one of the first engine or the second engine. In such a manner, it will be appreciated that in certain exemplary aspects, the first engine may be configured similarly to the first engine 100A and the second engine may be configured similarly to the second engine 100B, or alternatively may be configured in any other suitable manner. Further, the first electric machine may be coupled to the first engine in a similar manner as the electric machine 56-1 in FIG. 2, as the electric machine 56-2 in FIG. 2. Similarly, the second electric machine may be coupled to the first engine in a similar manner as the other of the electric machine 56-1 or 56-2 in FIG. 2 when coupled to the first engine or as either of electric machines 56-1 or 56-2 in FIG. 2 when coupled to the second engine. Of course, in other aspects the first and second electric machines may be coupled to the first and/or second engines in any other suitable manner.

As is depicted in FIG. 6, the method (200) includes at (202) receiving data indicative of a first engine operating parameter, a second engine operating parameter, or both; at (204) determining a first engine operating parameter margin, a second parameter operating margin, or both; at (206) determining a load share for the first engine, the second engine, or both, or between the first engine and the second engine based on the first engine operating parameter margin, the second engine operating parameter margin, or both; and at (208) transferring a first amount of power to or from the first electric machine and a second amount of power to or from the second electric machine in response to the determined load share.

As will be appreciated from the description herein, the method (200) is generally provided to normalize the first and second engine operating parameter margins. As such, it will be appreciated that for the exemplary aspect depicted, determining the load share for the first engine, the second engine, or both, or between the first engine and the second engine at (206) includes at (210) determining the load share between the first engine and the second engine to reduce a difference between the first engine operating parameter margin and the second parameter operating margin, and similarly transferring the first amount of power to or from the first electric machine and the second amount of power to or from the second electric machine at (208) includes at (212) reducing a difference between the first engine operating parameter margin and the second parameter operating margin.

More particularly, referring particularly to the exemplary aspect of FIG. 6, it will be appreciated that the method 200 may apply to a hybrid electric propulsion system wherein the first electric machine is coupled to the first engine and the second electric machine is coupled to the second engine.

With such an exemplary aspect, receiving data indicative of a first engine operating parameter, a second engine operating parameter, or both at (202) includes at (214) receiving data indicative of a first engine operating parameter of the first engine while operating the first engine at a first power level and at (216) receiving data indicative of a second engine operating parameter of the second engine while operating the second engine at the first power level. In certain exemplary aspects, the first power level may be an idle power level, a cruise power level, or any other suitable power level.

In certain exemplary aspects, the first engine operating parameter and the second engine operating parameter may be based at least in part on one or more of the following: one or more fuel flows to the first and second engines, one or more operating temperatures of the first and second engines, one or more speeds of the first and second engines, one or more shaft torques of the first and second engines, one or more pressure measurements within the first and second engines, one or more thrust outputs of the first and second engines, one or more component identifiers for the first and second engines, one or more estimates or measurements of component consumed or residual life or performance of the first and second engines, or any combination of these or calculation derived from these.

Further, with this exemplary aspect, determining the first engine operating parameter margin, the second parameter operating margin, or both at (204) includes at (218) determining the first engine operating parameter margin and the second parameter operating margin. It will be appreciated that as used herein, the term "margin" generally refers to a different between a current parameter value and a maximum rated value or minimum rated value for that parameter for that engine.

In certain exemplary aspects, the first engine operating parameter margin and the second engine operating parameter margin are each fuel flow margins.

In certain exemplary aspects, the first engine operating parameter margin and the second engine operating parameter margin are each exhaust gas temperature margins.

Referring still to the exemplary aspect of the method 200 in FIG. 6, it will be appreciated that wherein determining the load share for the first engine, the second engine, or both, or between the first engine and the second engine at (206) includes at (220) determining the load share between the first engine and the second engine based on a difference in the first engine operating parameter margin and the second parameter operating margin.

Moreover, in at least certain exemplary aspects, determining the load share for the first engine, the second engine, or both, or between the first engine and the second engine at (206) further includes determining the load share between the first engine and the second engine based on a desired operating condition for the aircraft incorporating the engines or for the engines themselves. The desired operating condition may be a thrust output for the engines, an electrical power output/draw desired from the engines, etc. For example, the desired operating condition may require an amount of electric power to be extracted from the first and second engines, a desired amount of thrust from the first and second engines, etc.

Further, still, as noted above, the exemplary aspect of the method 200 depicted in FIG. 6 applies to a hybrid electric propulsion system wherein the first electric machine is coupled to the first engine and the second electric machine is couple to the second engine. In such a manner, it will be appreciated that the determined load share may include sharing power between the first and second engines, or if power is being extracted from the engines, altering a ratio of power extracted from the first engine and from the second engine, or if power is being added to the engines, altering a ratio of power provided to the first engine and to the second engine, or a combination thereof (e.g., extracting power to an external sink from one engine and adding power from an external source to the other engine, transferring power between the engines and adding power to one of the engines from an external source, transferring power between the engines and extracting power from one of the engines to an external sink, etc.).

In such a manner, it will be appreciated that transferring the first amount of power to or from the first electric machine and the second amount of power to or from the second electric machine in response to the determined load share at (208) may include at (222) transferring the first amount of power from the first electric machine and the second amount of power to the second electric machine. For example, in certain exemplary aspects, transferring the first amount of power to or from the first electric machine and the second amount of power to or from the second electric machine at (222) may include at (224) transferring the first amount of power from the first electric machine and providing at least a portion of the first amount of power to the second electric machine. In such a manner, the load share may include a transfer of power from the first engine to the second engine.

Additionally, or alternatively, in other exemplary aspects, the hybrid electric propulsion system may include a power source external to the first and second engines (such as an electric energy storage unit, such as a battery pack, or a third electric machine coupled to a third engine). In such a manner, it will be appreciated that transferring the first amount of power to or from the first electric machine and the second amount of power to or from the second electric machine in response to the determined load share at (208) may include at (226) transferring power from the at least one electric power source to the first electric machine, the second electric machine, or both. For example, transferring the first amount of power to or from the first electric machine and the second amount of power to or from the second electric machine in response to the determined load share at (208) may include at (228) transferring the first amount of power to the first electric machine from the power source, transferring the second amount of power to the second electric machine from the power source, or both.

Additionally, or alternatively, still, in other exemplary aspects, the hybrid electric propulsion system may include or be configured to provide power to an energy sink, such as an aircraft load. In such a manner, it will be appreciated that transferring the first amount of power to or from the first electric machine and the second amount of power to or from the second electric machine in response to the determined load share at (208) may include at (230) transferring the first amount of power from the first electric machine, transferring the second amount of power from the second electric machine.

For example, in certain exemplary aspects, as noted, the energy sink may be an aircraft load, such that transferring the first amount of power to or from the first electric machine and the second amount of power to or from the second electric machine in response to the determined load share at (208) may include transferring the first amount of electric power from the first electric machine to the aircraft load, and wherein transferring the second amount of electric power from the second electric machine comprises transferring the second amount of electric power from second first electric machine to the aircraft load.

More specifically, for this exemplary aspect, it will be appreciated that the second amount of power is different than the first amount of power. For example, the first amount of power may make up between five percent and 45 percent of a total of the first and second amounts of power, such as at least 10 percent, such as at least 15 percent, such as at least 20 percent, such as at least 25 percent, such as up to 40 percent, such as up to 35 percent, such as up to 35 percent of a total of the first and second amounts of power.

Referring now to FIG. 7, a flow diagram of a method 200 for operating a hybrid-electric propulsion system of an aircraft in accordance with another exemplary aspect of the present disclosure is provided. The method 200 of FIG. 7 may be similar to the exemplary method 200 of FIG. 6. For example, in certain exemplary aspects the method (200) includes at (202) receiving data indicative of a first engine operating parameter, a second engine operating parameter, or both; at (204) determining a first engine operating parameter margin, a second parameter operating margin, or both; at (206) determining a load share for the first engine, the second engine, or both, or between the first engine and the second engine based on the first engine operating parameter margin, the second engine operating parameter margin, or both; and at (208) transferring a first amount of power to or from the first electric machine and a second amount of power to or from the second electric machine in response to the determined load share.

However, for the exemplary aspect of FIG. 7, the first electric machine is coupled to a low pressure system of the first engine, and the second electric machine is coupled to a high pressure system of the first engine. Further, with such an exemplary aspect, transferring the first amount of power to or from the first electric machine and the second amount of power to or from the second electric machine in response to the determined load share at (208) includes at (236) transferring power between the high pressure system and low pressure system of the first engine through the first and second electric machines.

Referring still to FIG. 7, it will be appreciated that the method 200 may further include various aspects for either normalizing the margins between multiple engines or ensuring an amount of thrust generated from two engines is substantially the same. For example, the exemplary aspect of the method 200 of FIG. 6 further includes at (232) modifying a non-essential bleed air provided by the first engine, the second engine, or both in response to the determined load share and at (234) controlling for a thrust differential between the first and second gas turbine engines. These method steps may further apply to the exemplary aspect of the method 200 depicted in FIG. 6.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method for operating a hybrid-electric propulsion system of an aircraft, the hybrid-electric propulsion system comprising a first engine, a second engine, a first electric machine coupled to the first engine, and a second electric machine coupled to one of the first engine or the second engine, the method comprising: receiving data indicative of a first engine operating parameter, a second engine operating parameter, or both; determining a first engine operating parameter margin, a second parameter operating margin, or both; determining a load share for the first engine, the second engine, or both, or between the first engine and the second engine based on the first engine operating parameter margin, the second engine operating parameter margin, or both; and transferring a first amount of power to or from the first electric machine and a second amount of power to or from the second electric machine in response to the determined load share.

The method of one or more of these clauses, wherein the second electric machine is coupled to the second engine, and wherein receiving data indicative of the first engine operating parameter, the second engine operating parameter, or both comprises: receiving data indicative of a first engine operating parameter of the first engine while operating the first engine at a first power level; receiving data indicative of a second engine operating parameter of the second engine while operating the second engine at the first power level; and wherein determining the first engine operating parameter margin, the second parameter operating margin, or both comprises determining the first engine operating parameter margin and the second parameter operating margin.

The method of one or more of these clauses, wherein the second amount of power is different than the first amount of power.

The method of one or more of these clauses, wherein determining the first engine operating parameter margin, the second parameter operating margin, or both comprises determining both the first engine operating parameter margin and the second parameter operating margin, and wherein determining the load share for the first engine, the second engine, or both, or between the first engine and the second engine comprises determining the load share between the first engine and the second engine to reduce a difference between the first engine operating parameter margin and the second parameter operating margin.

The method of one or more of these clauses, wherein the first engine operating parameter and the second engine operating parameter are based at least in part on one or more of the following: one or more fuel flows to the first and second engines, one or more operating temperatures of the first and second engines, one or more speeds of the first and second engines, one or more shaft torques of the first and second engines, one or more pressure measurements within the first and second engines, one or more thrust outputs of the first and second engines, one or more component identifiers for the first and second engines, one or more estimates or measurements of component consumed or residual life or performance of the first and second engines, or any combination of these or calculation derived from these.

The method of one or more of these clauses, wherein the first engine operating parameter margin is smaller than the first engine operating parameter margin, and wherein the second amount of power is greater than the first amount of power.

The method of one or more of these clauses, wherein the first electric machine is coupled to a low pressure system of the first engine, and wherein the second electric machine is coupled to a high pressure system of the first engine.

The method of one or more of these clauses, wherein transferring the first amount of power to or from the first electric machine and the second amount of power to or from the second electric machine comprises transferring the first amount of power from the first electric machine and the second amount of power to the second electric machine.

The method of one or more of these clauses, wherein the first engine operating parameter margin and the second engine operating parameter margin are each fuel flow margins.

The method of one or more of these clauses, wherein the first engine operating parameter margin and the second engine operating parameter margin are each exhaust gas temperature margins.

The method of one or more of these clauses, wherein transferring the first amount of power to or from the first electric machine and the second amount of power to or from the second electric machine comprises transferring the first amount of power from the first electric machine and providing at least a portion of the first amount of power to the second electric machine.

The method of one or more of these clauses, wherein transferring the first amount of power to or from the first electric machine and the second amount of power to or from the second electric machine comprises transferring power from the at least one electric power source to the first electric machine, the second electric machine, or both.

The method of one or more of these clauses, wherein the second electric machine is coupled to the second engine, and wherein transferring the first amount of power to or from the first electric machine and the second amount of power to or from the second electric machine comprises transferring a first amount of electric power from the first electric machine; and transferring a second amount of power from the second electric machine, and wherein the second amount of power is different than the first amount of power.

The method of one or more of these clauses, wherein transferring the first amount of electric power from the first electric machine comprises transferring the first amount of electric power from the first electric machine to an aircraft load, and wherein transferring the second amount of electric power from the second electric machine comprises transferring the second amount of electric power from second first electric machine to the aircraft load.

The method of one or more of these clauses, wherein the first amount of power makes up between five percent and 45 percent of a total of the first and second amounts of power.

The method of one or more of these clauses, further comprising: controlling for a thrust differential between the first and second gas turbine engines.

The method of one or more of these clauses, wherein determining the first engine operating parameter margin, the second parameter operating margin, or both comprises determining the first engine operating parameter margin and the second parameter operating margin, and wherein transferring the first amount of power to or from the first electric machine and the second amount of power to or from the second electric machine comprises reducing a difference between the first engine operating parameter margin and the second parameter operating margin.

The method of one or more of these clauses, wherein determining the load share for the first engine, the second engine, or both, or between the first engine and the second engine comprises determining the load share between the first engine and the second engine based on a difference in the first engine operating parameter margin and the second parameter operating margin.

The method of one or more of these clauses, further comprising modifying a non-essential bleed air provided by the first engine, the second engine, or both in response to the determined load share.

A system comprising a first engine, a second engine, a first electric machine coupled to the first engine, a second electric machine coupled to the first engine or the second engine, and a controller, the controller including memory and one or more processors, the memory storing instructions that when executed by the one or more processors cause the system to perform the following: receive data indicative of a first engine operating parameter, a second engine operating parameter, or both; determine a first engine operating parameter margin, a second parameter operating margin, or both;

determine a load share for the first engine, the second engine, or both, or between the first engine and the second engine based on the first engine operating parameter margin, the second engine operating parameter margin, or both; and transferring a first amount of power to or from the first electric machine and a second amount of power to or from the second electric machine in response to the determined load share.

The system of one or more of these clauses, wherein the instruction when executed by the one or more processors further cause the system to perform one or more of the steps of the method of one or more of these clauses.

The invention claimed is:

1. A method for operating a hybrid-electric propulsion system of an aircraft, the hybrid-electric propulsion system comprising a first engine, a second engine, a first electric machine coupled to the first engine, and a second electric machine coupled to one of the first engine or the second engine, the method comprising: receiving data indicative of a first engine operating parameter, a second engine operating parameter, or both; determining a first engine operating parameter margin, a second parameter operating margin, or both; determining a load share for the first engine, the second engine, or both, or between the first engine and the second engine based on the first engine operating parameter margin, the second engine operating parameter margin, or both; and transferring a first amount of power to or from the first electric machine and a second amount of power to or from the second electric machine in response to the determined load share; wherein the second electric machine is coupled to the second engine, and wherein receiving data indicative of the first engine operating parameter, the second engine operating parameter, or both comprises: receiving data indicative of a first engine operating parameter of the first engine while operating the first engine at a first power level; receiving data indicative of a second engine operating parameter of the second engine while operating the second engine at the first power level; and wherein determining the first engine operating parameter margin, the second parameter operating margin, or both comprises determining the first engine operating parameter margin and the second parameter operating margin.

2. The method of claim 1, wherein the second amount of power is different than the first amount of power.

3. The method of claim 1, wherein determining the first engine operating parameter margin, the second parameter operating margin, or both comprises determining both the first engine operating parameter margin and the second parameter operating margin, and wherein determining the load share for the first engine, the second engine, or both, or between the first engine and the second engine comprises determining the load share between the first engine and the second engine to reduce a difference between the first engine operating parameter margin and the second parameter operating margin.

4. The method of claim 1, wherein the first engine operating parameter and the second engine operating parameter are based at least in part on one or more of the following: one or more fuel flows to the first and second engines, one or more operating temperatures of the first and second engines, one or more speeds of the first and second engines, one or more shaft torques of the first and second engines, one or more pressure measurements within the first and second engines, one or more thrust outputs of the first and second engines, one or more component identifiers for the first and second engines, one or more estimates or measurements of component consumed or residual life or performance of the first and second engines, or any combination of these or calculation derived from these.

5. The method of claim 1, wherein the first engine operating parameter margin is smaller than the first engine operating parameter margin, and wherein the second amount of power is greater than the first amount of power.

6. The method of claim 1, wherein the first electric machine is coupled to a low pressure system of the first engine, and wherein the second electric machine is coupled to a high pressure system of the first engine.

7. The method of claim 6, wherein transferring the first amount of power to or from the first electric machine and the second amount of power to or from the second electric machine comprises transferring the first amount of power from the first electric machine and the second amount of power to the second electric machine.

8. The method of claim 1, wherein the first engine operating parameter margin and the second engine operating parameter margin are each fuel flow margins.

9. The method of claim 1, wherein the first engine operating parameter margin and the second engine operating parameter margin are each exhaust gas temperature margins.

10. The method of claim 1, wherein transferring the first amount of power to or from the first electric machine and the second amount of power to or from the second electric machine comprises transferring the first amount of power from the first electric machine and providing at least a portion of the first amount of power to the second electric machine.

11. The method of claim 1, wherein transferring the first amount of power to or from the first electric machine and the second amount of power to or from the second electric machine comprises transferring power from the at least one electric power source to the first electric machine, the second electric machine, or both.

12. The method of claim 1, wherein the second electric machine is coupled to the second engine, and wherein transferring the first amount of power to or from the first electric machine and the second amount of power to or from the second electric machine comprises
transferring a first amount of electric power from the first electric machine; and
transferring a second amount of power from the second electric machine, and wherein the second amount of power is different than the first amount of power.

13. The method of claim 12, wherein transferring the first amount of electric power from the first electric machine comprises transferring the first amount of electric power from the first electric machine to an aircraft load, and wherein transferring the second amount of electric power from the second electric machine comprises transferring the second amount of electric power from second first electric machine to the aircraft load.

14. The method of claim 13, wherein the first amount of power makes up between five percent and 45 percent of a total of the first and second amounts of power.

15. The method of claim 1, further comprising:
controlling for a thrust differential between the first and second gas turbine engines.

16. The method of claim 1, wherein determining the first engine operating parameter margin, the second parameter operating margin, or both comprises determining the first engine operating parameter margin and the second parameter operating margin, and wherein transferring the first amount of power to or from the first electric machine and the second amount of power to or from the second electric machine comprises reducing a difference between the first engine operating parameter margin and the second parameter operating margin.

17. The method of claim 1, wherein determining the load share for the first engine, the second engine, or both, or between the first engine and the second engine comprises determining the load share between the first engine and the second engine based on a difference in the first engine operating parameter margin and the second parameter operating margin.

18. The method of claim 1, further comprising modifying a non-essential bleed air provided by the first engine, the second engine, or both in response to the determined load share.

* * * * *